United States Patent
Johnson et al.

(10) Patent No.: US 7,085,903 B2
(45) Date of Patent: Aug. 1, 2006

(54) METHOD, APPARATUS, AND PROGRAM FOR IMPROVING DATA MIRRORING PERFORMANCE IN A SCSI TOPOLOGY

(75) Inventors: Gregory A. Johnson, Colorado Springs, CO (US); Travis A. Bradfield, Colorado Springs, CO (US); Robert E. Ward, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 472 days.

(21) Appl. No.: 10/728,574

(22) Filed: Dec. 5, 2003

(65) Prior Publication Data
US 2005/0125616 A1    Jun. 9, 2005

(51) Int. Cl.
*G06F 12/16* (2006.01)
(52) U.S. Cl. ..................................... 711/162
(58) Field of Classification Search .............. 711/162
See application file for complete search history.

(56) References Cited

U.S. PATENT DOCUMENTS 6,665,780 B1 *   12/2003   Bradley ...................... 711/162

2005/0015407 A1 *   1/2005   Nguyen et al. ............. 707/200

* cited by examiner

*Primary Examiner*—Jack A. Lane
(74) *Attorney, Agent, or Firm*—Yee & Associates

(57) ABSTRACT

A silent mirroring protocol is provided, which eliminates the arbitration/selection times associated with all nexuses after the first nexus. During the initial SCSI bus negotiation, the initiator determines the transfer mode capability of all targets. The initiator establishes a group identification. Participants of the group recognize the group and look for an individual identification within the group. The initiator performs arbitration/selection with attention to the leader of the group. The initiator uses a message out phase with a vendor command to select a participant for a data block transfer. Each participant snoops the bus and recognizes when it is the target. If the initiator has more data to mirror, the process is repeated. When the last data block is transferred, the initiator sends a message out to the last participant, which is interpreted by the target leader as a command to release the bus. Each participant reselects the nexus initiator and returns a status.

20 Claims, 3 Drawing Sheets

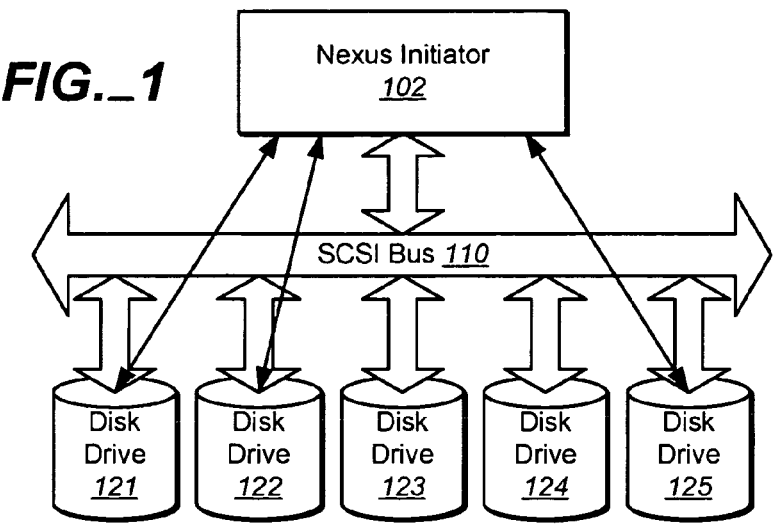
FIG._1
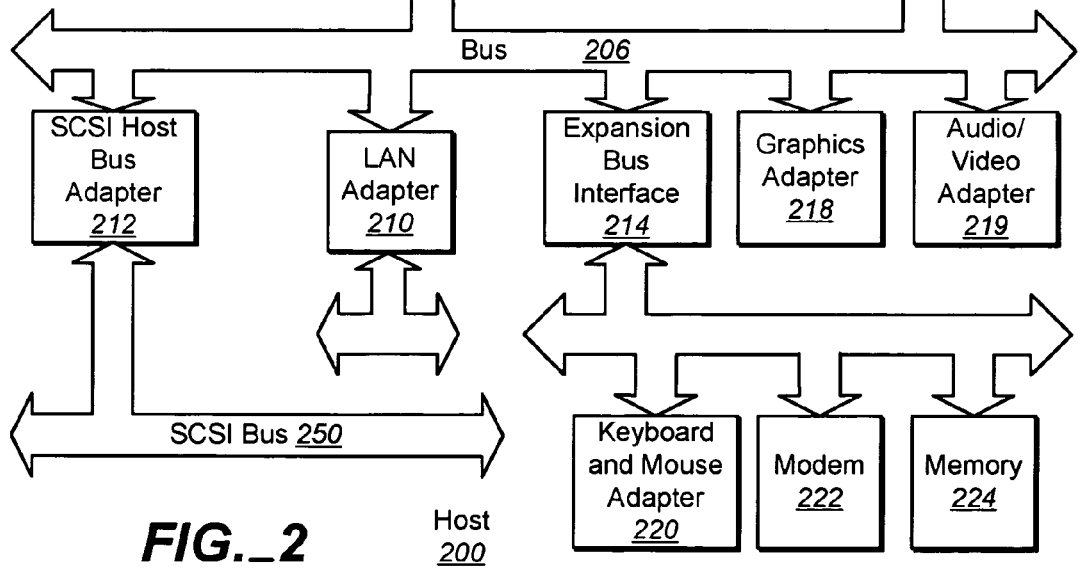
FIG._2

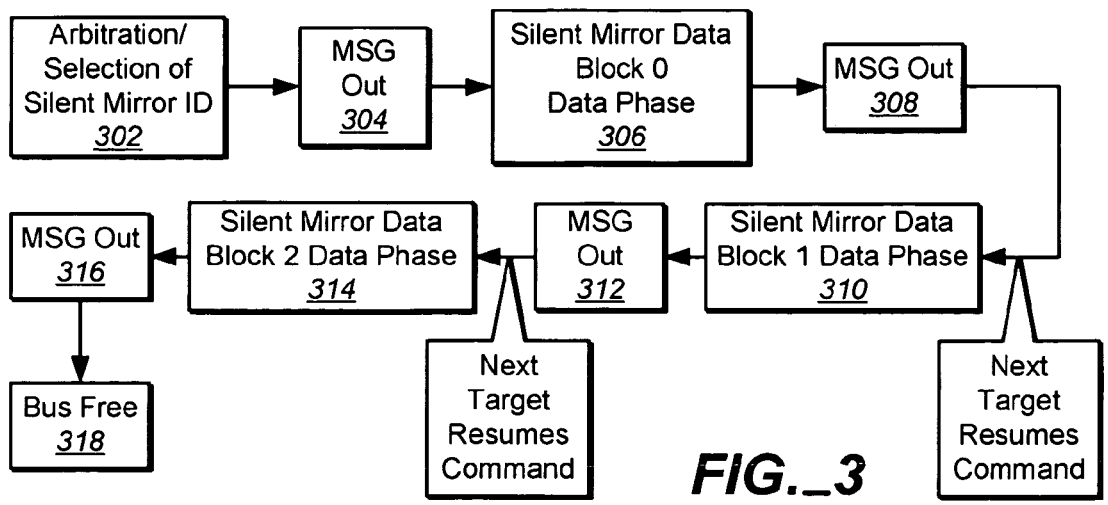
FIG._3
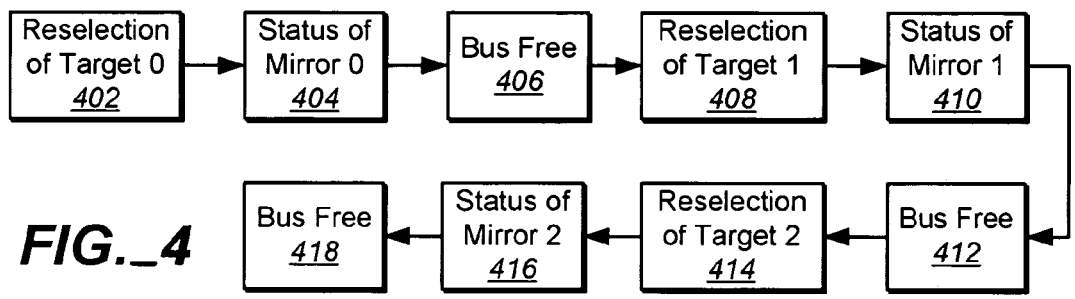
FIG._4
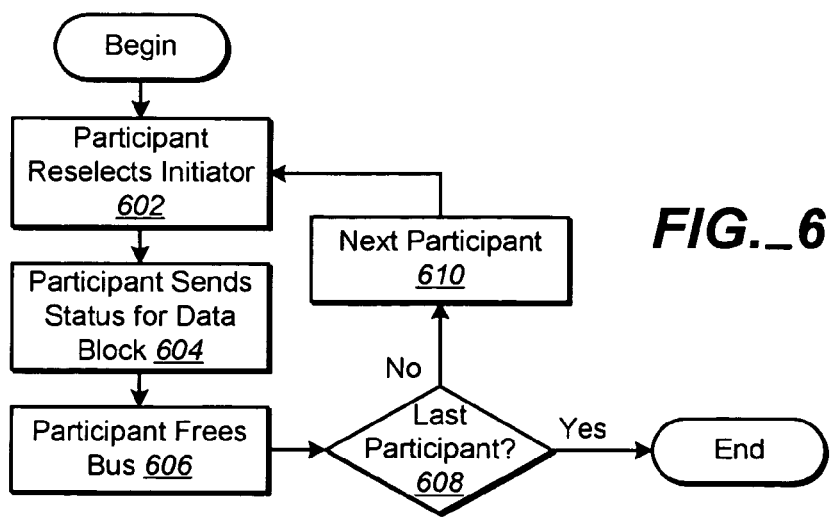
FIG._6

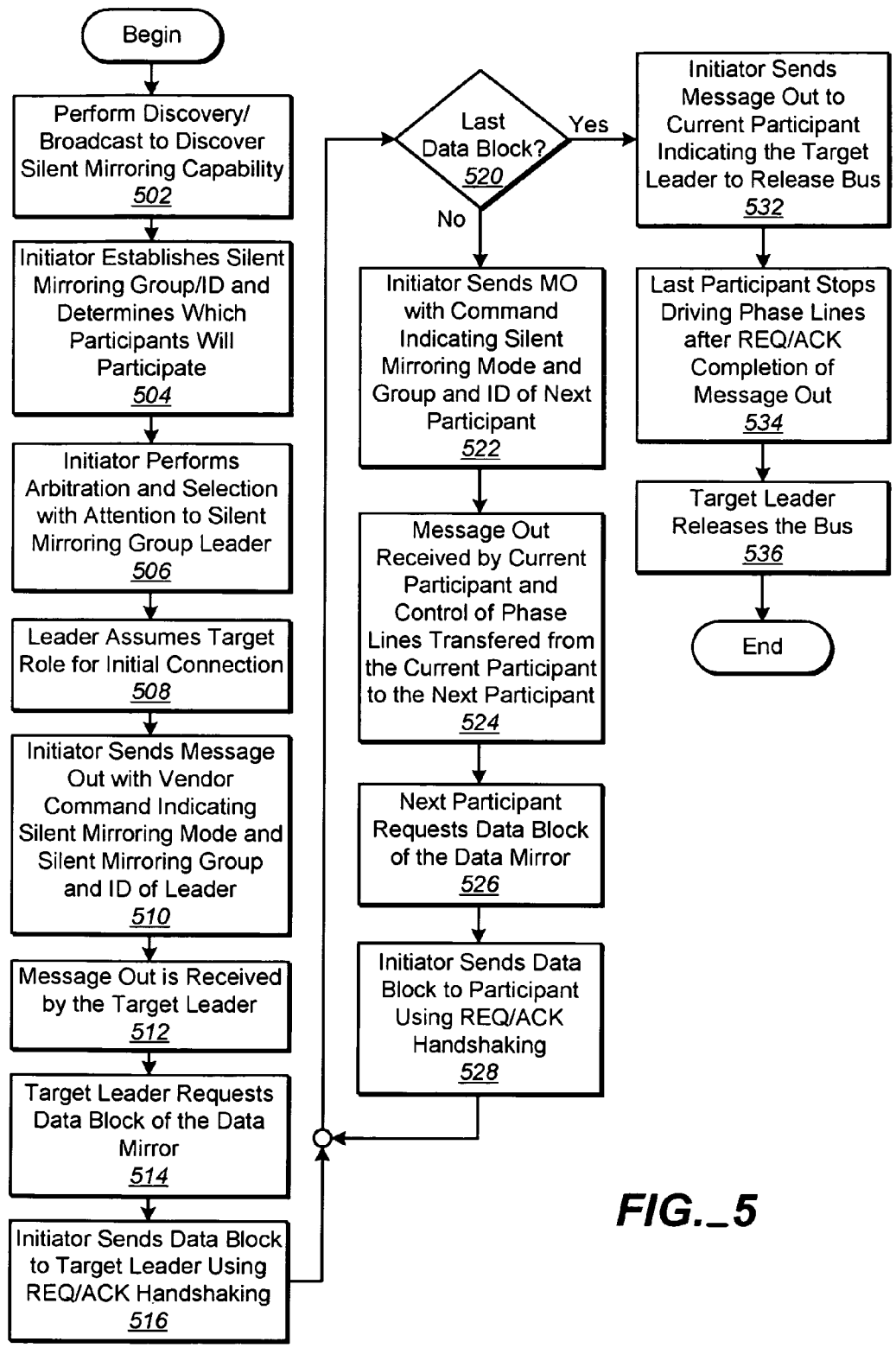
FIG._5

METHOD, APPARATUS, AND PROGRAM FOR IMPROVING DATA MIRRORING PERFORMANCE IN A SCSI TOPOLOGY

BACKGROUND OF THE INVENTION

1. Technical Field

The present invention relates to small computer system interface protocols and, in particular, to data mirroring in small computer system interface protocols. Still more particularly, the present invention provides a method, apparatus, and program for improving data mirroring performance in a small computer system interface topology.

2. Description of the Related Art

Small computer system interface (SCSI) is a hardware interface that allows for the connection of up to fifteen peripheral devices to a single controller called a "SCSI host adapter" of a computer device. SCSI peripherals are daisy chained together using a second port to connect each device to the next device in line. SCSI is a bus structure itself and functions like a miniature local area network (LAN), connecting up to sixteen devices including the host adapter. SCSI allows any two devices to communicate at one time. For example, a host may communicate with a peripheral or a peripheral may communicate with another peripheral.

The Ultra 320 parallel SCSI bus protocol is likely the last technology node for parallel SCSI due to other emerging protocols. A move to 640 Mbps has been abandoned and is not likely to continue. Serial attached SCSI (SAS) is in development; however, products using the Ultra 320 parallel SCSI bus protocol are expected to become legacy parallel SCSI products for years to come. One way to upgrade speed using the existing parallel SCSI products is to improve data throughput.

Data mirroring in normal SCSI topologies requires one host and at least two storage devices to store data. Typically, a data mirroring application duplicates a block of data across two disk drives. For example, a first drive contains the original block of data and a second drive contains a duplicate copy of the block of data for fault tolerance. A data mirroring application could also create multiple duplicate copies of data. For example, a first drive may contain the original block of data and two or more other drives may contain duplicate copies of the block of data.

The use of multiple disk drives during data mirroring requires establishing an initiator/target nexus for each disk drive. Each initiator/target nexus has an associated arbitration/selection time. This incurs a 2.4 µs or greater delay for each nexus that is established for each data block transfer. With that limitation, a 4.8 µs or greater delay would be encountered for a common data mirroring application with only one duplicate data drive. With N duplicate data drives, a $((N+1)\cdot 2.4)\mu s$ delay would be encountered for arbitration/selection. These delays affect the throughput of the SCSI topology when using data mirroring.

SUMMARY OF THE INVENTION

The present invention recognizes the disadvantages of the prior art and provides a method, apparatus, and program for silent mirroring, which improves the performance of data mirroring with multiple storage devices commonly found in a parallel SCSI topology. The silent mirroring technique of the present invention eliminates the arbitration/selection times associated with all nexuses after the first nexus. During the initial SCSI bus negotiation, the initiator determines the transfer mode capability of all targets. The initiator establishes a group identification. Participants of the group recognize the group and look for an individual identification within the group. The initiator performs arbitration/selection with attention to the leader of the group. The target leader holds the bus by driving the busy line. The initiator uses a message out phase with a vendor command to select a participant for a data block transfer. Each participant snoops the bus and recognizes when it is the target. Each participant drives the phase lines until the data block transfer is complete. If the initiator has more data to mirror, the process is repeated. When the last data block is transferred, the initiator sends a message out to the last participant, which is interpreted by the target leader as a command to release the bus. Each participant reselects the nexus initiator and returns a status.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram illustrating silent mirroring discovery in accordance with a preferred embodiment of the present invention;

FIG. 2 is a block diagram of a data processing system in which the present invention may be implemented;

FIG. 3 illustrates an example of a silent mirroring write to three target disk drives in accordance with a preferred embodiment of the present invention;

FIG. 4 illustrates an example silent mirroring return status operation in accordance with a preferred embodiment of the present invention;

FIG. 5 is a flowchart illustrating the operation of a silent mirroring protocol in accordance with an exemplary embodiment of the present invention; and FIG. 6 is a flowchart illustrating a process for returning status for a silent mirroring operation in accordance with an exemplary embodiment of the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

The present invention provides a method for improving the performance of data mirroring with multiple disk drives commonly found in a parallel SCSI topology. This method improves aggregate data throughput in data mirroring applications that utilize the parallel SCSI bus protocol. Data mirroring in normal SCSI topologies requires one host and at least two disk drives that store data. Typically, a data mirroring application duplicates a block of data across two disk drives, for example a first drive contains the original block of data and a second drive contains a duplicate copy of the block of data. A data mirroring application may also create multiple duplicate copies of data, for example a first drive contains the original block of data and multiple other drives contain duplicate copies of the block of data.

The use of multiple disk drives during data mirroring requires establishing an initiator/target nexus for each disk drive. Each initiator/target nexus has an associated arbitration/selection time. The present invention provides a "silent mirroring" method to improve data throughput during data mirroring by eliminating the arbitration/selection times associated with all nexuses after the first nexus. In a data mirroring application that creates multiple duplicate copies of data across multiple drives, the data throughput improvement is even more significant because of the multiple arbitration/selection times that are eliminated.

With reference now to the figures and in particular with reference to FIG. 1, a block diagram illustrating silent mirroring discovery is shown in accordance with a preferred embodiment of the present invention. As mentioned above, current SCSI data mirroring applications have to create an initiator/target nexus through arbitration and selection. In the example depicted in FIG. 1, nexus initiator 102 is connected to disk drives 121-125 through SCSI bus 110. Consider data mirroring with an original block of data written to disk drive 121 and duplicated on disk drive 122 and disk drive 125. Nexus initiator 102 would have to create an initiator/target nexus for disk drive 121 to write the original block of data. Then, the nexus initiator would have to create an initiator/target nexus for disk drive 122 to duplicate the block of data to disk drive 122. Further, the nexus initiator would also have to create an initiator/target nexus for drive 125 to duplicate the block of data to disk drive 125. This incurs a 2.4 µs or greater delay for each nexus that is established for each data block transfer. With that limitation, a 4.8 µs delay would be injected for a common data mirroring application, for example one original data drive and one duplicate data drive. In this example, a 7.2 µs delay (i.e. 3×2.4 µs) is incurred for the original drive and the two duplicate drives.

In accordance with the present invention, silent mirroring would remove all but one of the arbitration/selection delays by establishing a pre-negotiated connection with the duplicate disk drives for the use of mirroring data blocks. In a data mirroring application that contains one original data drive and N duplicate data drives, a ((N+1)·2.4)µs delay would normally be injected for arbitration/selection delays. However, silent mirroring removes N of the (N+1) arbitration/selection delays by establishing a pre-negotiated connection with multiple disk drives for the use of mirroring data blocks.

During the initial SCSI bus negotiation, initiator 102 determines the transfer mode capability of all targets. After the initiator determines which transfer mode to use for targets (e.g., disk drives 121, 122, and 125) used in the data mirroring application, the initiator can query targets to determine silent mirroring capability. Initiator 102 establishes a group identification. Participants of the group recognize the group and look for an individual identification within the group. The initiator performs arbitration/selection with attention to the leader of the group. The target leader, for example disk drive 121, holds the bus by driving the busy line. The initiator uses a message out phase with a vendor command to select a participant for a data block transfer. Each participant snoops the bus and recognizes when it is the target. Each participant drives the phase lines until the data block transfer is complete. If the initiator has more data to mirror, the process is repeated. When the last data block is transferred, the initiator sends a message out to the last participant, which is interpreted by the target leader as a command to release the bus. After data transfer and duplication, each participant reselects the nexus initiator and returns a status.

With reference now to FIG. 2, a block diagram of a data processing system is shown in which the present invention may be implemented. Data processing system 200 is an example of a host computer, that includes a nexus initiator such as 102 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors.

In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Typical PCI local bus implementations will support three or four PCI expansion slots or add-in connectors.

SCSI host bus adapter 212 provides a connection for target devices connected to SCSI bus 250. In accordance with a preferred embodiment of the present invention, SCSI host bus adapter 212 employs a parallel SCSI bus protocol, such as, for example, the Ultra 320 parallel SCSI bus protocol, with silent mirroring. As such, the SCSI host bus adapter receives an I/O command to write or read data and performs mirroring using the silent mirroring techniques of the present invention. More particularly, when a write command is received, the SCSI host bus adapter writes each block of data to a lead target and other participating target devices that belong to a silent mirroring group.

Data processing system 200 or, more particularly, SCSI host bus adapter 212 is the nexus initiator. According to the silent mirroring technique of the present invention, the nexus initiator establishes an initiator/target nexus with only the lead target and uses vendor commands to effectuate the data mirror with the other participating members of the silent mirroring group. The silent mirror group members snoop SCSI bus 250 for message out (MO) bytes with a vendor command byte. When the last data block is transferred, the initiator sends a message out to the last participant, which is interpreted by the target leader as a command to release the bus.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system. The depicted example in FIG. 2 and above-described examples are not meant to imply architectural limitations. The processes of the present invention are performed by processor 202 using computer implemented instructions, which may be located in a memory such as, for example, main memory 204, memory 224, or in one or more peripheral devices, such as target devices connected to SCSI bus 250.

The following protocol describes the negotiated silent mirroring capability. During the initial SCSI bus negotiation, the silent mirroring capability is discovered/broadcasted to all participants on the SCSI bus. After each silent mirroring participant is discovered, the nexus initiator establishes a silent mirroring group/ID and determines which targets will participate and in which order. Establishment happens through the use of vendor commands.

One possible method for an initiator to determine the silent mirroring capability for each target is shown in Table 1 for a silent mirroring group containing three drives. The initiator performs a selection with attention to the target leader. The message out phase uses a vendor command byte, shown as >xx, to indicate that the initiator is querying the target for silent mirroring mode capability. The vendor command may be any byte that is recognized as a command and not used for another command.

The high order nibble of the silent mirroring group/ID byte, which is shown as >yz in Table 1, indicates which silent mirroring group the target is in. The low order nibble of the silent mirroring group/ID byte indicates the silent mirroring ID of the target. For example, 0 in the higher order nibble indicates a particular silent mirroring group and 0 in the lower order nibble indicates that the target is the leader of the silent mirroring group. The message out phase uses two bytes, the vendor command byte and the silent mirroring group/ID byte, for the leader and subsequent drives and three bytes for the last drive. The third byte, which is shown as ">FF" in Table 1, indicates that a drive is the last drive in a silent mirroring group. The target responds with a message in phase that indicates that the target supports silent mirroring mode and agrees to participate in silent mirroring.

TABLE 1

| Target | SCSI ID | SS Group/ID (>yz) | Message Out Bytes |
|--------|---------|-------------------|-------------------|
| Drive 0 | >05 | >00 | >xx, >00 |
| Drive 1 | >04 | >01 | >xx, >01 |
| Drive 2 | >03 | >02 | >xx, >02, >FF |

Once the discovery process is completed, the enhanced data mirroring can be performed. FIG. 3 illustrates an example of a silent mirroring write to three target disk drives in accordance with a preferred embodiment of the present invention. The nexus initiator initiates the data mirroring transaction by first performing an arbitration and selection with attention to the target that has been negotiated to be the silent mirroring target leader of a given silent mirroring group (block 302). The negotiated target leader assumes the target role for this initial connection on the initial silent data mirror.

Once the nexus is established, the initiator sends out a first series of message out (MO) bytes (block 304). Possible MO info would include a vendor command indicating a silent mirroring write (or read), silent mirroring Group/ID, LUN/Tag, and the number of bytes to be transferred. Once the first message is requested (REQed) in by the target leader, the target leader will REQ for the first data block of the data mirror. The original data block, silent mirror data block 0, is sent to the target leader in a data phase (block 306). This is performed through the use of standard SCSI data write (or read) transfers that use request (REQ)/acknowledge (ACK) handshaking.

Once the first data mirror block is acknowledged (ACKed) by the initiator, the initiator will assert attention (ATN) to signal for the next data mirror block. Here the target leader changes to message out phase and REQs in the message. All negotiated targets "snoop" the bus to determine if it is a switch role message. The nexus initiator then sends MO (block 308) with the vendor command byte for silent mirroring mode and the silent mirroring group/ID to select the next participating target. This switch role message instructs the targets to hand over control of the nexus to the next target in the negotiated session.

At this point, the target leader would continue to maintain the connection by asserting the busy (BSY) line, for example, but would stop driving phase lines (CMD, MSG, IO). Then, the second target in the silent mirroring group starts driving the phase lines and REQs in the next data mirror block. The first duplicate data block, silent mirror data block 1, is sent to the next participating target in a data phase (block 310).

Since the initiator has more data to mirror to one more participant, the process is repeated. The nexus initiator then sends MO (block 312) with the vendor command byte for silent mirroring mode and the silent mirroring group/ID to select the next participating target. However, since this is the last participant, the MO also includes a byte (e.g., >FF) that indicates that the next participating target will be the last participating target in the silent mirroring group. This MO phase signals the target leader to prepare to relinquish the bus after the next data phase (block 314) and message out phase indicating to release the connection (block 316). The next duplicate data block, silent mirror data block 2, is sent to the next participating target in the next data phase (block 314). Once all data blocks are mirrored, the nexus initiator sends a MO indicating to release the connection (block 316). The last drive stops driving the phase lines and the bus is relinquished (i.e. BSY deasserted) by the target leader (block 318).

Note that the initial arbitration/selection and the use of the silent mirroring group/ID bytes in the MO phases allow the target drive order in the silent mirroring connection to be changed. For example, in FIG. 3, the silent mirroring target drive order is drive 0, drive 1, and drive 2. However, the silent mirroring target drive order could be changed to, for example, drive 2, drive 1, and drive 0 by having the initiator perform arbitration and selection with attention to the drive 2 target and changing the silent mirroring group/IDs used in the MO phases accordingly.

Using the silent mirroring protocol of the present invention, the arbitration and selection times associated with two of the three nexuses has been reduced, in this example, compared to the standard protocol, thus enhancing SCSI bus data mirroring throughput. On a large data transfer using small data block mirrors, this silent mirroring method has tremendous throughput improvement. For example, normal data mirroring with two disk drives (i.e. one original data drive and one duplicate data drive) of a 1 MB data chunk broken up into 512 byte blocks would require 4000 nexuses (2000 to the original data drive and 2000 to the duplicate data drive) to be established. Using the silent mirroring method of the present invention, the nexuses can be reduced from 4000 to 2000 nexuses. This drastic reduction in nexuses has a tremendous impact on aggregate data throughput.

To notify the nexus initiator of a successful data mirror transfer, each participating target in the silent mirroring group may reselect the initiator and send a status good for the respective data block. FIG. 4 illustrates an example silent mirroring return status operation in accordance with a preferred embodiment of the present invention. Three target devices participate in a data mirroring group as in the example shown in FIG. 3. Target 0, the target leader, reselects the nexus initiator (block 402) and sends the status of mirror 0 to the nexus initiator (block 404). Target 0 then relinquishes the bus (block 406). Target 1 then reselects the nexus initiator (block 408) and sends the status of mirror 1 to the nexus initiator (block 410). Target 1 then relinquishes the bus (block 412). Finally, target 2 reselects the nexus initiator (block 414) and sends the status of mirror 2 (step 416). Target 2 then relinquishes the bus (block 418).

If any mirror is not successful, the data mirroring operation may be repeated, starting with the leader of the silent mirroring group, and ending with the unsuccessful mirror. Since the nexus initiator includes an indicator (e.g., >FF) that indicates that the target is the last participating target in the silent mirroring group, the repeated data mirroring operation may end with the mirror data block that failed in the original data mirroring operation without completing every mirror. The indicator signals that the last data phase is upcoming and the target leader will relinquish the bus after the next MO bus release command. The remaining targets snoop the bus and detect the indicator to determine that they do not participate in the repeated data mirroring operation. The indicator of a last participating target may have other uses not within the purpose and scope of this description.

Another method for re-transfer of unsuccessful mirrors is to reconfigure the participating targets in a silent mirroring group. Suppose that silent mirror data block 1 (block 310) and silent mirror data block 2 (block 314) in FIG. 3 were initially unsuccessful mirrors. The nexus initiator may initiate the data mirroring transaction by first performing an arbitration and selection with attention to the drive 1 target (i.e the drive 1 target associated with the initial unsuccessful silent mirror data block 1). The initiator then sends a MO that includes a vendor command indicating silent mirroring write (or read) and the silent mirroring group/ID byte (e.g. >xx, >01 bytes). In this case, the drive 1 target can infer that it is now the "target leader" in this silent mirroring transfer since it was selected by the initiator. The silent mirror data block 1 is re-transferred in a data phase.

Once the silent mirror data block 1 is transferred, the initiator asserts attention (ATN) to signal for the next data mirror block. Here, the target leader (drive 1 target) changes to message out phase and REQs in the message. All negotiated targets "snoop" the bus to determine if it is a switch role message. The nexus initiator then sends a MO with the vendor command byte for silent mirroring mode and the silent mirroring group/ID to select the next participating target, which in this example is the drive 2 target.

Since, in this example, the drive 2 target is the last participating target, the MO bytes include the last participant indicator >FF (e.g. MO bytes >xx, >02, >FF). This switch role message instructs drive 1 target to hand over control of the phase lines (CMD, MSG, IO) to the drive 2 target. The silent mirror data block 2 is re-transferred in a data phase. The initiator then asserts attention (ATN) and sends a MO indicating to release the connection. The last drive (drive 2 target in this example) stops driving the phase lines and the bus is relinquished (i.e. BSY deasserted) by the target leader (drive 1 target in this example). Note that the initial arbitration/selection and the use of the silent mirroring group/ID bytes in the MO phases allows the target drive order in the silent mirroring transfer to be changed (e.g. Initiator performs arbitration and selection with attention to the drive 2 target followed by MO and the first data phase. Then the next MO includes silent mirroring group/ID for the drive 1 target and is followed by the second data phase).

An alternative method for re-transferring a single unsuccessful mirror is for the initiator to arbitrate and select the target that had an unsuccessful mirror, and then re-transfer the failed data mirror (i.e. a normal SCSI arbitration, selection, and data phase).

FIG. 5 is a flowchart illustrating the operation of a silent mirroring protocol in accordance with an exemplary embodiment of the present invention. The process begins and performs a discovery/broadcast to discover silent mirroring capabilities of targets connected to a bus (step 502). The initiator establishes a silent mirroring group/ID and determines which participants will participate in the silent mirroring operation (step 504). Then, the initiator performs arbitration and selection with attention to the silent mirroring group leader (step 506).

The leader assumes the target role for the initial connection (step 508). The initiator sends a message out with a vendor command indicating a silent mirroring mode and a silent mirroring group and an identification of the silent mirroring group leader (step 510). The message out is received by the target leader (step 512) and the target leader requests the data block of the data mirror (step 514). Next, the initiator sends the data block to the target leader using REQ/ACK handshaking (step 516).

A determination is made as to whether the data block is the last data block in the mirror (step 520). This determination may be made by, for example, identifying an indicator in the last message out from the initiator. For example, the initiator may include an indicator byte, such as ">FF", in the message out before the last data block of the data mirror. If the data block was not the last data block, the initiator sends a message out with a vendor command indicating a silent mirroring mode and a silent mirroring group and an identification of the next participant (step 522). Then, the current participating target drives the phase lines and receives the message out and control of phase lines is then transferred from the current participating target to the next participating target (step 524). The next participating target then requests the data block of the data mirror (step 526). Next, the initiator sends the data block to the next participant using REQ/ACK handshaking (step 528). Thereafter, the process returns to step 520 to determine whether the data block is the last data block in the mirror.

If the data block is the last data block in the mirror in step 520, the initiator sends a message out to the current participating target indicating the target leader to release the bus (step 532). The last participating target stops driving the phase lines after REQ/ACK completion of the message out (step 534). The target leader then releases the bus (step 536) and the process ends.

FIG. 6 is a flowchart illustrating a process for returning status for a silent mirroring operation in accordance with an exemplary embodiment of the present invention. The process begins and the first participant reselects the nexus initiator (step 602). The participating target sends a status for the data block of the data mirror to the initiator (step 604) and the participant frees the bus (step 606).

A determination is made as to whether the participant is the last target in the silent mirroring operation (step 608). If the participant is not the last participant, then the next participant is considered (step 610) and the process returns to step 602 for the next participant to reselect the initiator. If the participant is the last participant in the data mirroring group in step 608, the process ends.

Thus, the present invention solves the disadvantages of the prior art by providing a silent mirroring protocol that reduces the number of nexuses that must be established. The nexus initiator performs a discovery operation to discover targets with silent mirroring capability. The initiator also establishes a silent mirroring group and uses silent mirroring group/identifications to direct data access to a participating target in a particular silent mirroring group. The initiator performs arbitration and selection with only the silent mirroring group leader. The remaining participating targets snoop the bus for a message out with a vendor command indicating a silent mirroring mode, a silent mirroring group, and a silent mirroring group ID. The target leader holds the bus by asserting the busy line and each participating target drives the phase lines during a data phase and subsequent message out phase. Once all data blocks are mirrored, the nexus initiator sends a message out indicating to release the connection. The last drive stops driving the phase lines and the bus is relinquished by the target leader. To notify the nexus initiator of a successful data mirror transfer, each participating target in the silent mirroring group may reselect the initiator and send a status good for the respective data block.

It is important to note that while the present invention has been described in the context of a fully functioning data processing system, those of ordinary skill in the art will appreciate that the processes of the present invention are capable of being distributed in a form of a computer readable medium of instructions and in a variety of forms. Further, the present invention applies equally regardless of the particular type of signal bearing media actually used to carry out the distribution. Examples of computer readable media include recordable-type media such a floppy disk, a hard disk drive, a RAM, a CD-ROM, a DVD-ROM. The computer readable media may take the form of coded formats that are decoded for actual use in a particular data processing system.

What is claimed is:

1. A method for performing data mirroring, the method comprising:
    initiating a data mirroring operation with a group of target devices connected to a bus;
    performing arbitration and selection with attention to a target leader within the group of target devices;
    sending a target leader identification message identifying the target leader;
    sending a data block to the target leader;
    sending a target selection message identifying a participating target within the group of target devices; and
    sending a data block to the participating target without creating an initiator/target nexus with the participating target.

2. The method of claim 1, wherein the target leader holds the bus for the data mirroring operation.

3. The method of claim 2, wherein holding the bus includes asserting a busy line on the bus.

4. The method of claim 1, further comprising:
    sending a bus release message instructing the target leader to release the bus.

5. The method of claim 1, wherein the participating target drives at least one phase line during a data phase.

6. The method of claim 1, wherein the target leader identification message and the target selection message include a vendor command that indicates that an initiator of the message is notifying for silent mirroring mode capability.

7. The method of claim 1, wherein the target leader identification message and the target selection message include a silent mirroring group identification and a target device identification.

8. The method of claim 1, wherein the target selection message includes an indicator that the participating target is the last target device in the data mirroring operation.

9. The method of claim 1, wherein each target device in the group of target devices returns a status.

10. The method of claim 9, further comprising:
    identifying at least one unsuccessful data block; and
    re-transferring the at least one unsuccessful data block using a data mirroring operation.

11. An apparatus for performing data mirroring, the apparatus comprising:
    a bus;
    a host connected to the bus; and
    a group of target devices connected to the bus, wherein the group of target devices includes a plurality of participating targets including a target leader,
    wherein the host initiates a data mirroring operation with the group of target devices, performs arbitration and selection with attention to the target leader, sends a target leader identification message identifying the target leader, sends a data block to the target leader, sends a target selection message identifying a selected participating target within the group of target devices, and sends a data block to the selected participating target without creating an initiator/target nexus with the selected participating target.

12. The apparatus of claim 11, wherein the target leader holds the bus for the data mirroring operation.

13. The apparatus of claim 12, wherein holding the bus includes asserting a busy line on the bus.

14. The apparatus of claim 11, wherein the host sends a bus release message instructing the target leader to release the bus.

15. The apparatus of claim 11, wherein the selected participating target drives at least one phase line of the bus during a data phase.

16. The apparatus of claim 11, wherein the target leader identification message and the target selection message include a vendor command that indicates that an initiator of the message is notifying for silent mirroring mode capability.

17. The apparatus of claim 11, wherein the target leader identification message and the target selection message include a silent mirroring group identification and a target device identification.

18. The apparatus of claim 11, wherein the target selection message includes an indicator that the selected participating target is the last target device in the data mirroring operation.

19. The apparatus of claim 11, wherein each target device in the group of target devices returns a status.

20. A computer program product, in a computer readable medium, for performing data mirroring, the computer program product comprising:

- instructions for initiating a data mirroring operation with a group of target devices connected to a bus;
- instructions for performing arbitration and selection with attention to a target leader within the group of target devices;
- instructions for sending a target leader identification message identifying the target leader;
- instructions for sending a data block to the target leader;
- instructions for sending a target selection message identifying a participating target within the group of target devices; and
- instructions for sending a data block to the participating target without creating an initiator/target nexus with the participating target.

* * * * *